United States Patent
Dozen

(10) Patent No.: US 11,011,165 B2
(45) Date of Patent: May 18, 2021

(54) VOICE INPUT DEVICE, NON-TRANSITORY COMPUTER READABLE MEDIUM STORING VOICE INPUT PROGRAM, AND VOICE INPUT SYSTEM

(71) Applicant: KYOCERA Document Solutions Inc., Osaka (JP)

(72) Inventor: Kazuki Dozen, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 92 days.

(21) Appl. No.: 16/117,909

(22) Filed: Aug. 30, 2018

(65) Prior Publication Data

US 2019/0066684 A1    Feb. 28, 2019

(30) Foreign Application Priority Data

Aug. 30, 2017  (JP) .............................. JP2017-165030

(51) Int. Cl.
| | |
|---|---|
| *G10L 15/00* | (2013.01) |
| *G10L 15/22* | (2006.01) |
| *G06F 3/16* | (2006.01) |
| *G10L 15/20* | (2006.01) |
| *G10L 15/065* | (2013.01) |
| *G10L 15/07* | (2013.01) |

(52) U.S. Cl.
CPC .............. *G10L 15/22* (2013.01); *G06F 3/16* (2013.01); *G06F 3/167* (2013.01); *G10L 15/20* (2013.01); *G10L 15/065* (2013.01); *G10L 15/07* (2013.01); *G10L 2015/223* (2013.01)

(58) Field of Classification Search
CPC combination set(s) only.
See application file for complete search history.

(56) References Cited

U.S. PATENT DOCUMENTS

| | | | |
|---|---|---|---|
| 2011/0111805 A1* | 5/2011 | Paquier | H04M 1/72552 455/563 |
| 2015/0032451 A1* | 1/2015 | Gunn | G10L 15/063 704/244 |

FOREIGN PATENT DOCUMENTS

JP      2016-200782 A    12/2016

* cited by examiner

*Primary Examiner* — Vu B Hang
(74) *Attorney, Agent, or Firm* — Hawaii Patent Services; Nathaniel K. Fedde; Kenton N. Fedde

(57) ABSTRACT

After acceptance of a start instruction of voice input, a voice input device determines whether a volume of input sound into a microphone exceeds a specific acceptable upper limit volume (S83). Upon determination that the volume of the sound input into the microphone exceeds the acceptable upper limit volume (S83: affirmative), the voice input device notifies a request to move the voice input device (S85). Upon determination that the volume of the sound input into the microphone is equal to or smaller than the acceptable upper limit volume (S83: negative), the voice input device starts inputting voice through the microphone (S89).

8 Claims, 7 Drawing Sheets

VOICE INPUT DEVICE, NON-TRANSITORY COMPUTER READABLE MEDIUM STORING VOICE INPUT PROGRAM, AND VOICE INPUT SYSTEM

INCORPORATION BY REFERENCE

This application is based upon, and claims the benefit of priority from, corresponding Japanese Patent Application No. 2017-165030 filed in the Japan Patent Office on Aug. 30, 2017, the entire contents of which are incorporated herein by reference.

BACKGROUND

1. Field of the Invention

The present disclosure relates to a voice input device, a non-transitory computer readable medium storing a voice input program, and a voice input system that input voice through a microphone.

2. Description of Related Art

A voice input system provided with a voice input device having a microphone and electronic equipment which executes an action generating sound has been conventionally proposed.

SUMMARY

The voice input device according to an aspect of the present disclosure is a voice input device provided with a microphone, the device including: a voice input means that inputs voice through the microphone; a start instruction acceptance means that accepts a start instruction of voice input by the voice input means; an input volume determination means that determines, after the start instruction acceptance means accepts the start instruction, whether a volume of sound input into the microphone exceeds a specific volume; and a movement request notification means that notifies a request to move the voice input device when the input volume determination means determines that the volume of the input sound exceeds the specific volume, wherein when the input volume determination means determines that the volume of the input sound is equal to or smaller than the specific volume, the voice input means starts voice input.

A non-transitory computer readable medium according to an aspect of the present disclosure stores a voice input program that is executed by a computer provided with a microphone. The voice input program causes the computer to implement a voice input means that inputs voice through the microphone; a start instruction acceptance means that accepts a start instruction of voice input by the voice input means; an input volume determination means that determines, after the start instruction acceptance means accepts the start instruction, whether a volume of sound input into the microphone exceeds a specific volume; and a movement request notification means that notifies a request to move the computer when the input volume determination means determines that the volume of the input sound exceeds the specific volume, wherein when the input volume determination means determines that the volume of the input sound is equal to or smaller than the specific volume, the voice input means starts inputting voice.

The voice input system according to an aspect of the present disclosure includes the voice input device described above; and electronic equipment that operates under an instruction from the voice input device, wherein the voice input device includes an instruction transmission means that transmits an instruction based on voice input by the voice input means to the electronic equipment.

DETAILED DESCRIPTION

Below, an embodiment of the present disclosure will be described with reference to the drawings.

First, a configuration of a voice input system according to an embodiment of the present disclosure will be described.

Figure 1:
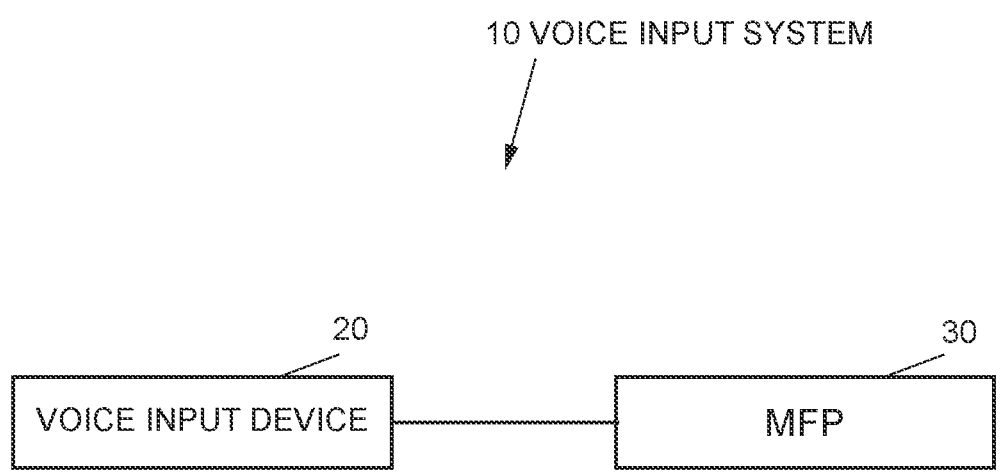
FIG. 1 is a block diagram of a voice input system according to an embodiment of the present disclosure.

FIG. 1 is a block diagram of a voice input system 10 according to the present embodiment.

As illustrated in FIG. 1, the voice input system 10 includes a voice input device 20 that inputs voice and a multifunction peripheral (MFP) 30 as electronic equipment operating under an instruction of the voice input device 20.

Figure 2:
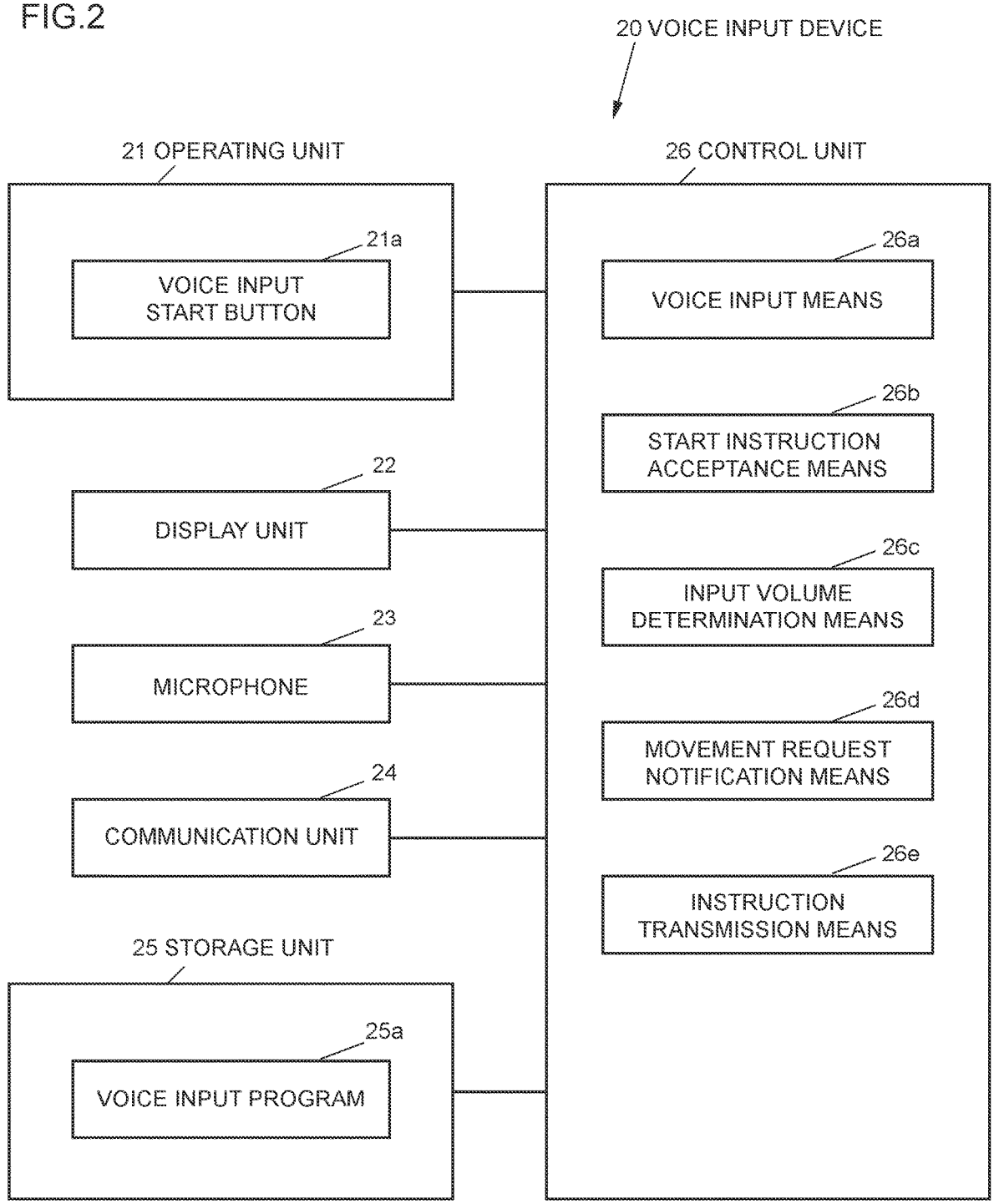
FIG. 2 is a block diagram of the voice input device illustrated in FIG. 1.

FIG. 2 is a block diagram of the voice input device 20.

As illustrated in FIG. 2, the voice input device 20 includes an operating unit 21 which is an input device, e.g., a button, with which various operations are input, a display unit 22 which is a display device, e.g., a liquid crystal display (LCD), displaying various types of data, a microphone 23, a communication unit 24 which is a communication device communicating with an external device via a network or directly in a wired or wireless manner, a storage unit 25 which is a nonvolatile storage device, e.g., semiconductor memory or a hard disk drive (HDD), storing various types of data, and a control unit 26 which controls the entire voice input device 20. The voice input device 20 may be formed by, for example, a computer, such as a smartphone or a tablet terminal.

The operating unit 21 includes a voice input start button 21a that accepts a start instruction of voice input.

The storage unit 25 stores a voice input program 25a for inputting voice through the microphone 23. The voice input program 25a may be installed in the voice input device 20 at the manufacturing stage of the voice input device 20, may be installed additionally in the voice input device 20 from an external storage medium, such as a Universal Serial Bus (USB) flash drive, or may be installed additionally in the voice input device 20 from a network.

The control unit 26 includes, for example, a central processing unit (CPU), read only memory (ROM) storing programs and various types of data, and random access memory (RAM) used as a work area of the CPU. The CPU executes the programs stored in the ROM or the storage unit 25.

When executing the voice input program 25a, the control unit 26 implements a voice input means 26a that inputs voice through the microphone 23, a start instruction acceptance means 26b that accepts a start instruction of voice input by the voice input means 26a, an input volume determination means 26c that determines, after acceptance of the start instruction by the start instruction acceptance means 26b, whether a volume of sound input into the microphone 23 exceeds a specific volume (hereinafter, "acceptable upper limit volume"), a movement request notification means 26d that notifies a request to move the voice input device 20 when the input volume determination means 26c determines that the volume of the input sound exceeds a specific acceptable upper limit volume, and an instruction transmission means 26e that transmits an instruction based on voice input by the voice input means 26a to the MFP 30. The acceptable upper limit volume is the largest volume of the input sound that does not hinder the voice input through the microphone 23.

Figure 3:
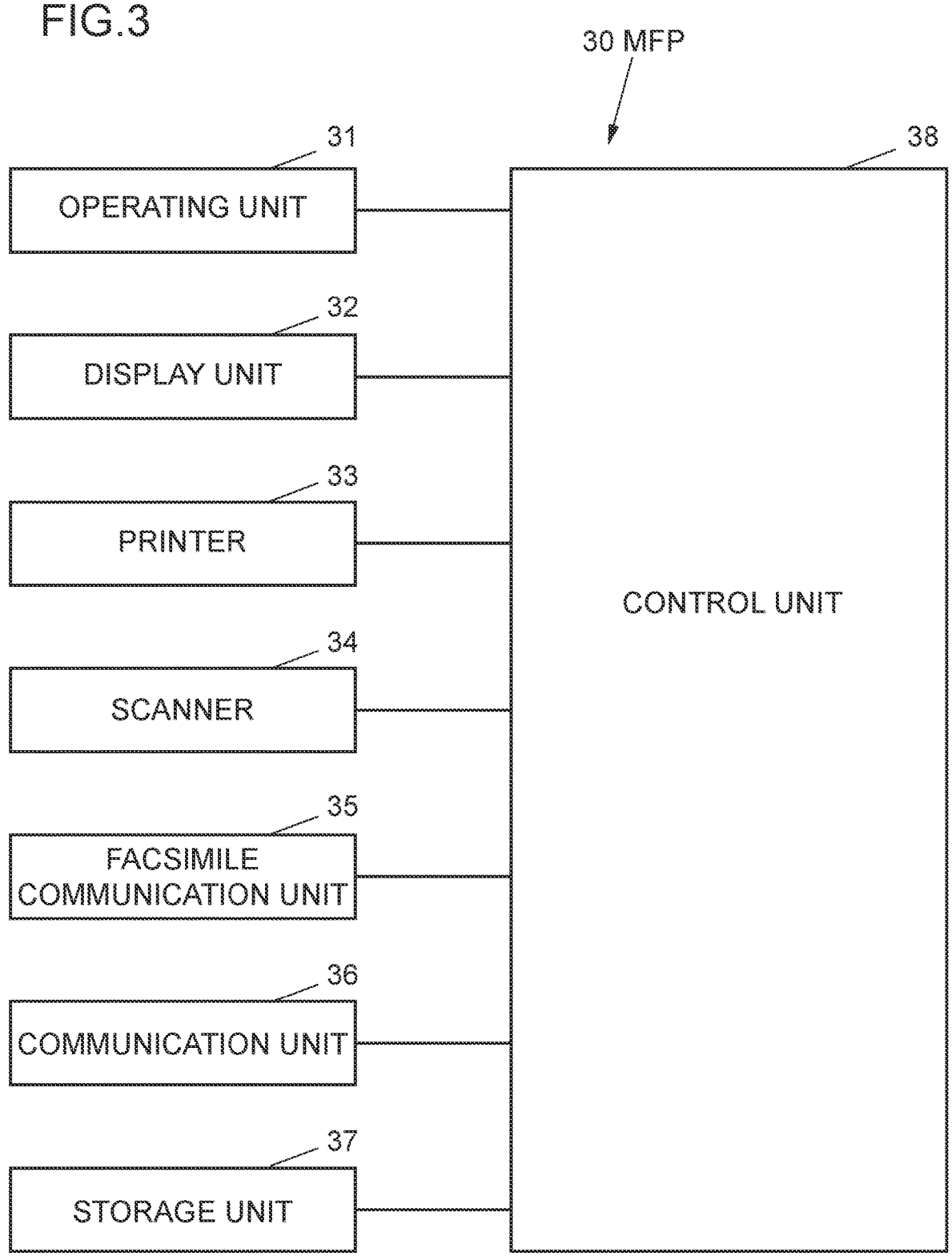
FIG. 3 is a block diagram of a multifunction peripheral (MFP) illustrated in FIG. 1.

FIG. 3 is a block diagram of the MFP 30.

As illustrated in FIG. 3, the MFP 30 includes an operating unit 31 which is an input device, e.g., a button, with which various operations are input, a display unit 32 which is a display device, e.g., an LCD, displaying various types of data, a printer 33 which is a printing device printing an image on a recording medium, e.g., a paper sheet, a scanner 34 which is a reading device reading an image from an original document, a facsimile communication unit 35 which is a facsimile device performing a facsimile communication with an unillustrated external facsimile device through a communication line, e.g., a public telecommunication line, a communication unit 36 which is a communication device communicating with an external device via a network or directly in a wired or wireless manner, a storage unit 37 which is a nonvolatile storage device, e.g., semiconductor memory or a HDD, storing various types of data, and a control unit 38 that controls the entire MFP 30.

The control unit 38 includes, for example, a CPU, ROM storing programs and various types of data, and RAM used as a work area of the CPU. The CPU executes the programs stored in the ROM or the storage unit 37.

Among processings executed by the MFP 30, processings that may interfere with the voice input by the voice input device 20, i.e., processings that may produce noise with respect to the voice input, may include, for example, "calibration" as processing of color adjustment of the printer 33 to improve reproductivity of color to be printed on a recording medium by the printer 33, and "printing" as processing of printing an image based on print data on a recording medium by using the printer 33.

Next, an operation of the voice input system 10 will be described.

Figure 4:
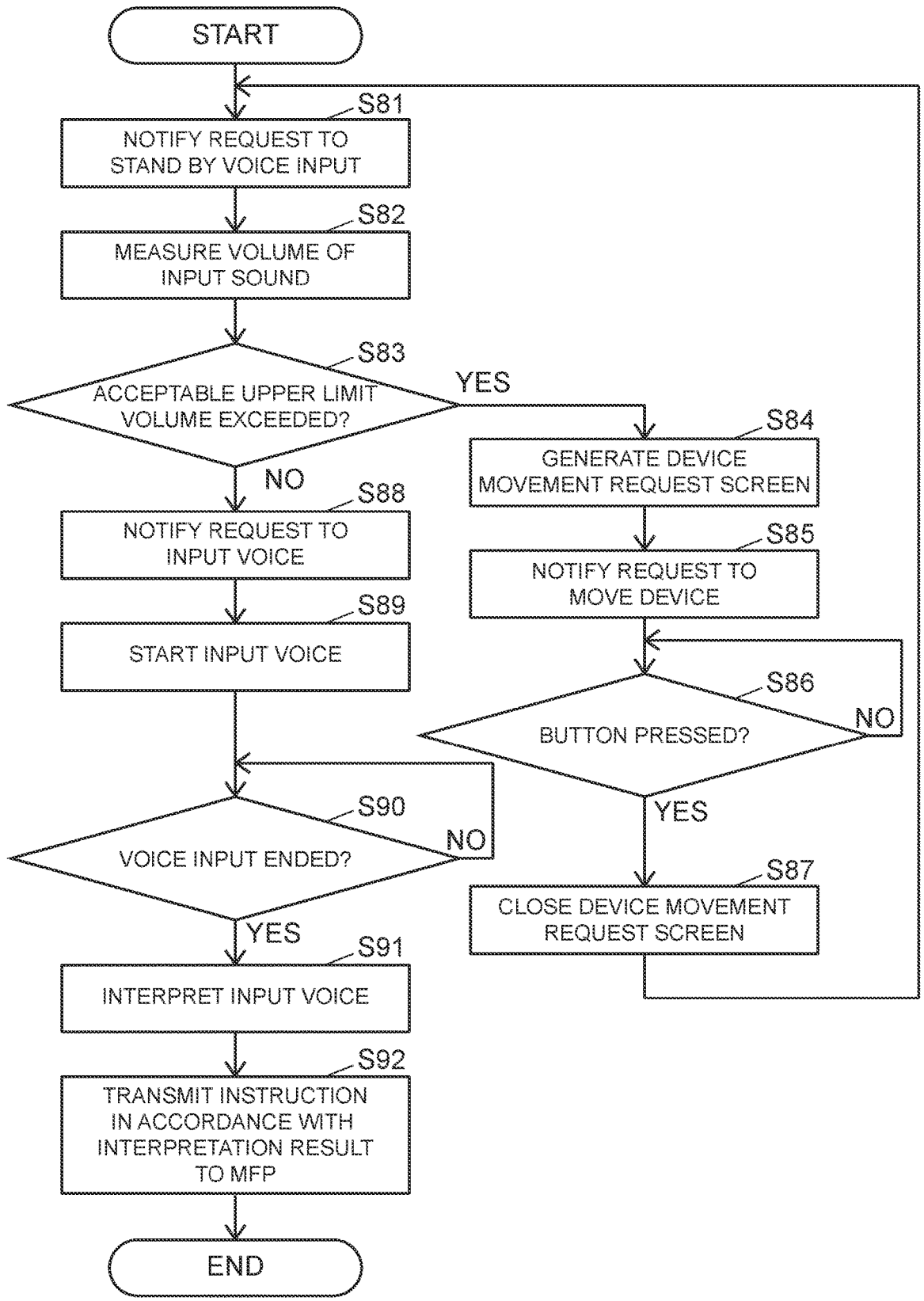
FIG. 4 is a flowchart of an operation of the voice input device illustrated in FIG. 2 when voice is to be input.

FIG. 4 is a flowchart of an operation of the voice input device 20 when voice is to be input.

A user can press the voice input start button 21a in the voice input device 20 through the operating unit 21. The start instruction acceptance means 26b of the voice input device 20 accepts, when the voice input start button 21a is pressed, a start instruction of voice input by the voice input means 26a and executes the operation illustrated in FIG. 4. The voice input start button 21a may be a hardware key or a software key displayed on a screen displayed on the display unit 22.

As illustrated in FIG. 4, the input volume determination means 26c displays a voice input standby request screen 40 (see FIG. 5) indicating a request for standby for voice input on the display unit 22 and notifies the request for the standby for the voice input (S81). Therefore, the user can stand by for the start of the voice input into the microphone 23.

Figure 5:
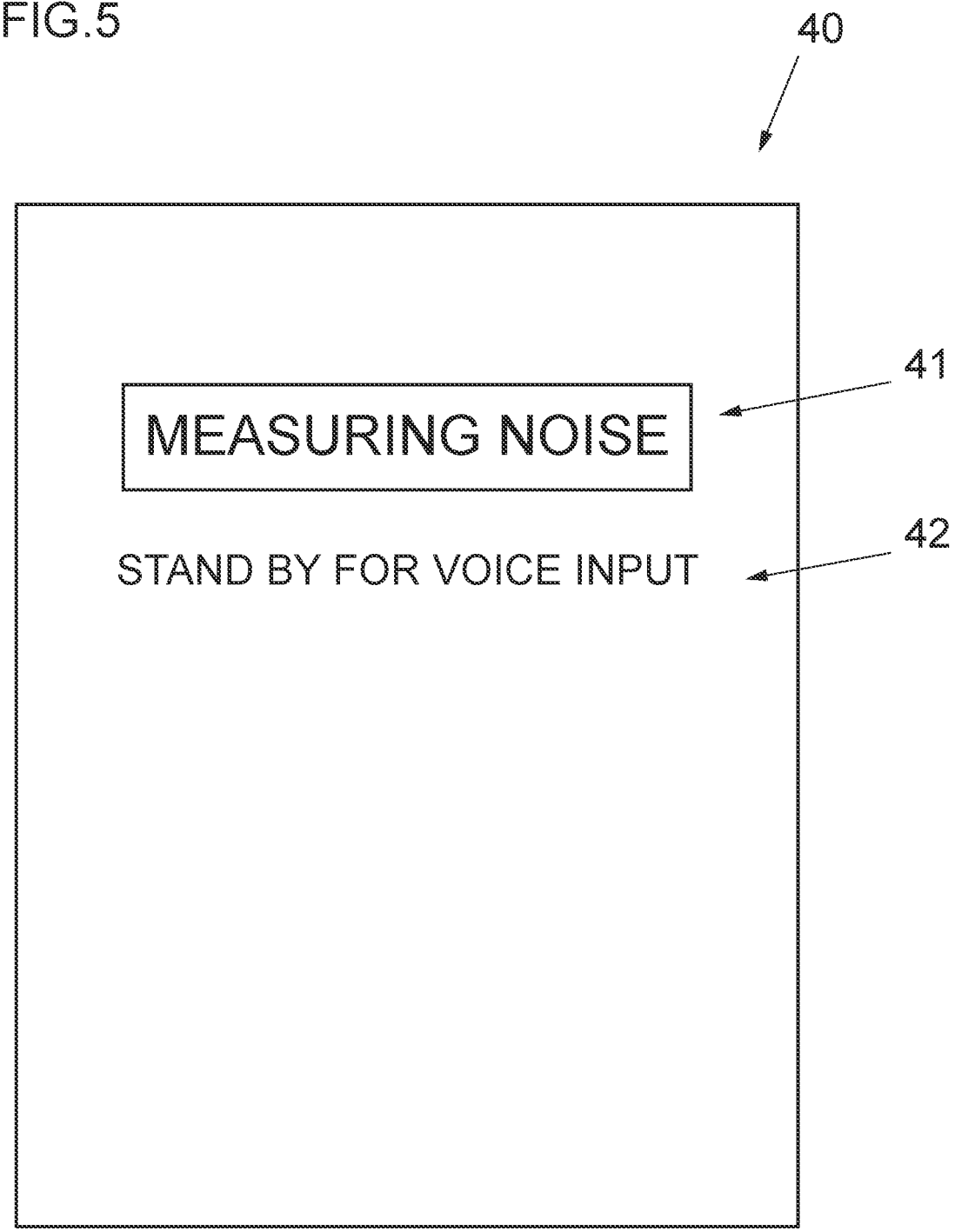
FIG. 5 illustrates an example of a voice input standby request screen displayed in the operation illustrated in FIG. 4.

The voice input standby request screen 40 illustrated in FIG. 5 includes a message 41 indicating that a volume of ambient sound of the voice input device 20 is being measured and a message 42 for requesting the user to standby for the voice input.

As illustrated in FIG. 4, after the processing of S81, the input volume determination means 26c measures the volume of the sound input into the microphone 23, i.e., the volume of the ambient sound of the voice input device 20 for a specific period of time (S82). The input volume determination means 26c also measures a direction in which main sound among other input sound into the microphone 23 (hereinafter, "main ambient sound") is input into the microphone 23 (hereinafter, "a main ambient sound direction"). When the voice input device 20 includes two microphones 23 disposed apart from each other, the input volume determination means 26c can, for example, determine the direction in which the sound is input into the microphones 23 based on at least one of a difference in time at which the sound is input in each of the two microphones 23 and a difference in volume of the sound input in each of the two microphones 23.

After the processing of S82, the input volume determination means 26c determines whether the volume of the sound input into the microphone 23 exceeds the acceptable upper limit volume based on the measurement result of S82 (S83).

If it is determined in S83 that the volume of the sound input into the microphone 23 exceeds the acceptable upper limit volume, i.e., the volume of the ambient sound of the voice input device 20 exceeds the acceptable upper limit volume, the movement request notification means 26d generates a device movement request screen 50 (see FIG. 6) as a popup indicating a request to move the voice input device 20 in a direction away from a generation source of the main ambient sound based on the main ambient sound direction measured in S82 (S84).

Figure 6:
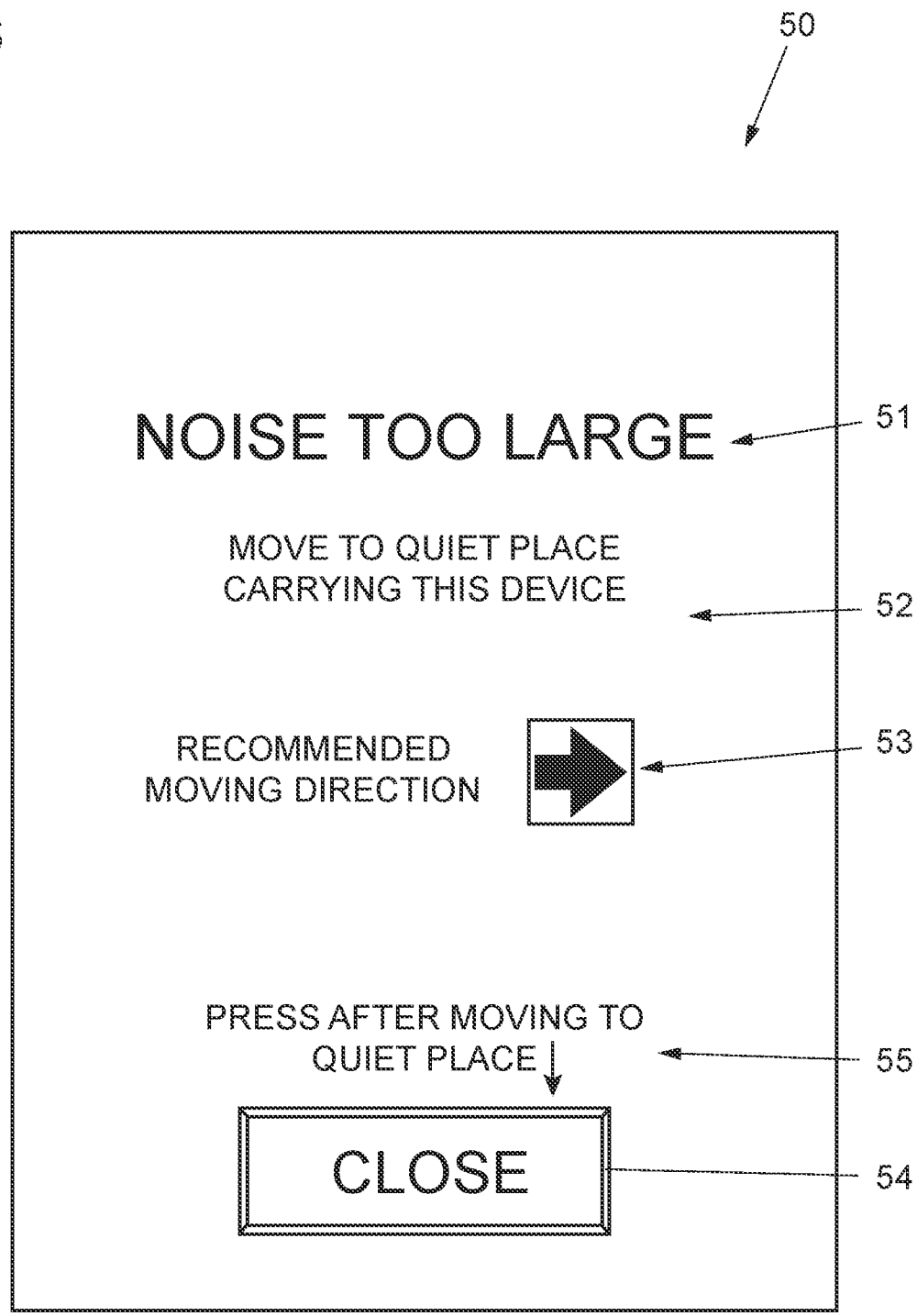
FIG. 6 illustrates an example of a device movement request screen displayed in the operation illustrated in FIG. 4.

The device movement request screen 50 illustrated in FIG. 6 includes a message 51 indicating that the volume of the ambient sound of the voice input device 20 is excessively large, a message 52 to request a user to move to a quiet place carrying the voice input device 20, an arrow 53 indicating a direction away from the generation source of the main ambient sound, a button 54 for accepting an instruction to delete the display of the device movement request screen 50, and a message 55 to request a user to press the button 54 after moving to a quiet place carrying the voice input device 20. As the direction away from the generation source of the main ambient sound, the movement request notification means 26d may employ, for example, an opposite direction of the main ambient sound direction measured in S82, or a direction in which a volume of the ambient sound of the voice input device 20 measured in S82 is the smallest.

As illustrated in FIG. 4, after the processing of S84, the movement request notification means 26d displays the device movement request screen 50 generated in S84 on the display unit 22, and notifies the request to move the voice input device 20 in the direction away from the generation source of the main ambient sound (S85).

The movement request notification means 26d determines whether the button 54 is pressed until it is determined that the button 54 is pressed (S86). The user may press the button 54 through the operating unit 21.

When the movement request notification means 26*d* determines in S86 that the button 54 is pressed, the movement request notification means 26*d* closes the device movement request screen 50 (S87).

Next, the input volume determination means 26*c* executes the processing of S81.

When it is determined in S83 that the volume of the sound input into the microphone 23 is equal to or smaller than the acceptable upper limit volume, i.e., the volume of the ambient sound of the voice input device 20 is equal to or smaller than the acceptable upper limit volume, the voice input means 26*a* displays a voice input request screen 60 (see FIG. 7) indicating a request to input voice on the display unit 22 and notifies a request of voice input (S88). Therefore, the user can start input of voice into the microphone 23.

Figure 7:
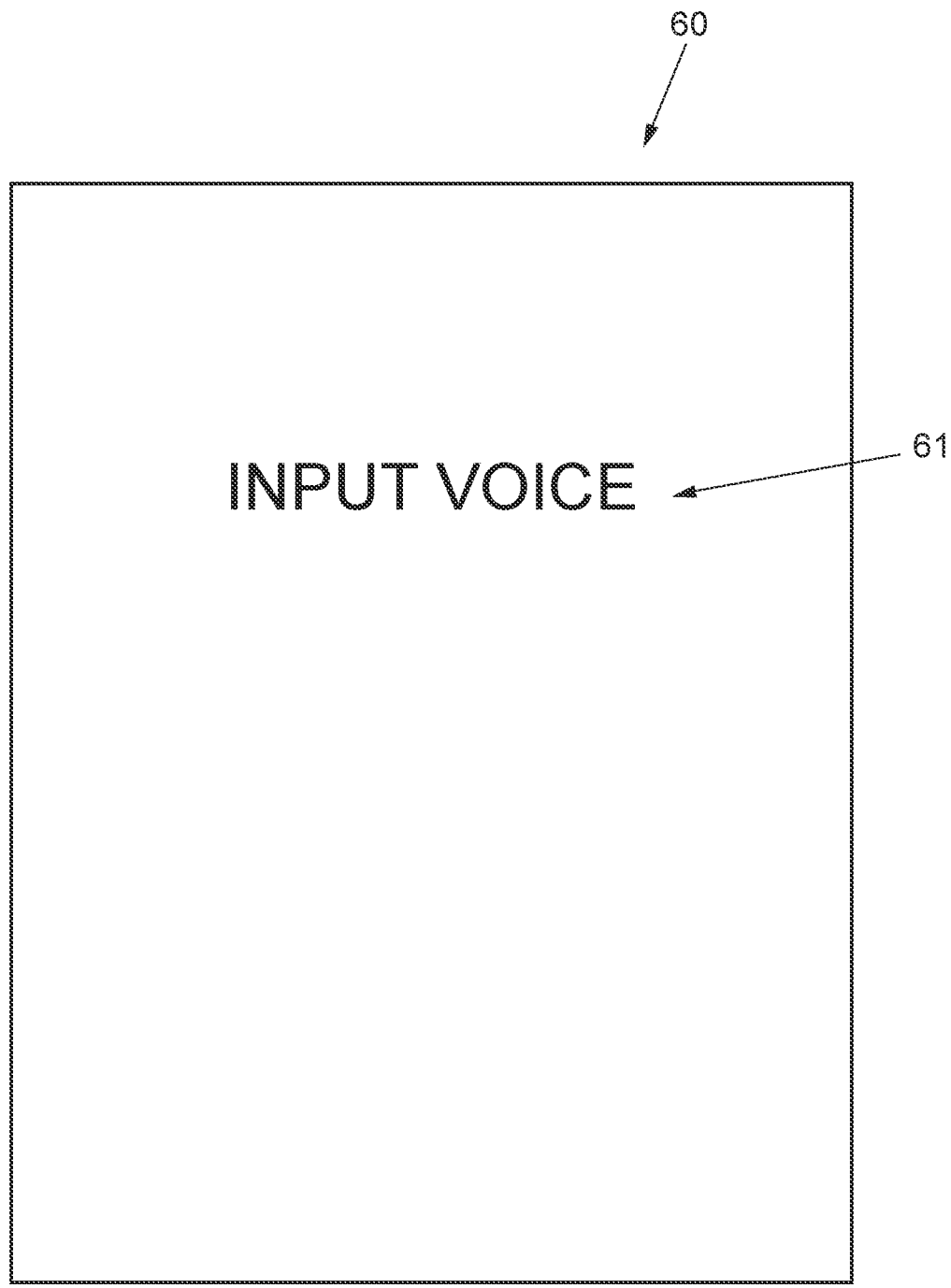
FIG. 7 illustrates an example of a voice input request screen displayed in the operation illustrated in FIG. 4.

The voice input request screen 60 illustrated in FIG. 7 includes a message 61 to request the user to input voice.

As illustrated in FIG. 4, the voice input means 26*a* starts inputting voice through the microphone 23 after the processing of S88 (S89).

Next, the voice input means 26*a* determines whether the voice input is ended until it is determined that the voice input is ended based on, for example, the volume of the sound input into the microphone 23 (S90). Here, the voice input means 26*a* may determine that the voice input is ended when a voice input end button for ending voice input is pressed through the operating unit 21, or by determining that voice input through the microphone 23 is not performed for a certain period of time.

When the voice input means 26*a* determines in S90 that the voice input is ended, the voice input means 26*a* interprets the voice input through the microphone 23 (S91).

Next, the instruction transmission means 26*e* transmits an instruction to make the MFP 30 execute processing based on an interpretation result in S91 (S92) and ends the operation illustrated in FIG. 4.

Therefore, the control unit 38 of the MFP 30 operates under the instruction transmitted from the voice input device 20 in S92.

As described above, when the volume of the sound input into the microphone 23 exceeds the acceptable upper limit volume after the start instruction of voice input is accepted (S83: affirmative), the voice input device 20 notifies the user of a request to move the voice input device 20 without starting inputting voice (S85). Therefore, possibility of properly inputting voice can be improved.

When the volume of the sound input into the microphone 23 exceeds the acceptable upper limit volume after the acceptance of the start instruction of the voice input (S83: affirmative), when requesting the user to move the voice input device 20 (S85), the voice input device 20 notifies the user of the direction away from the generation source of the main ambient sound. Therefore, the voice input device 20 can be moved away from the generation source of the main ambient sound in an efficient manner for the user and, therefore, possibility of properly inputting voice can be improved. When notifying the user of the request to move the voice input device 20, the voice input device 20 does not necessarily have to notify the user of the direction away from the generation source of the main ambient sound.

Even if a start instruction of voice input is not accepted again after notifying the user of the request to move the voice input device 20 in S85, the voice input device 20 re-determines whether the volume of the sound input into the microphone 23 exceeds the acceptable upper limit volume (S83) when an instruction to delete the display of the request to move the voice input device 20 is input into the operating unit (S86: affirmative). Therefore, customer convenience is improved. After notifying the user of the request to move the voice input device 20 in S85, the voice input device 20 may put an end to the operation illustrated in FIG. 4 without executing the operation of S86. Even if the voice input device 20 puts an end to the operation illustrated in FIG. 4 without executing the operation of S86 after notifying the user of the request to move the voice input device 20 in S85, if a start instruction of voice input is accepted again, the operation illustrated in FIG. 4 can be executed again.

When the volume of the sound input into the microphone 23 exceeds the acceptable upper limit volume after the voice input device 20 accepts the start instruction of the voice input (S83: affirmative), the voice input system 10 notifies the user of the request to move the voice input device 20 without starting inputting voice by the voice input device 20 (S85). Even if the MFP 30 that operates under the instruction from the voice input device 20 is a generation source of the main ambient sound, the MFP 30 can be made to operate under the instruction based on proper voice input without suppressing the operation of the MFP 30.

The electronic equipment of the present disclosure is an MFP in the present embodiment. However, the electronic equipment may be an image forming apparatus other than an MFP (e.g., a printer, a facsimile machine, a copier, or a scanner), or may be electronic equipment other than an image forming apparatus (e.g., a personal computer (PC)).

What is claimed is:

1. A voice input device provided with a microphone, the device including:
   a controller and memory comprising a program, wherein the controller is configured to execute the program to provide functions of:
   a voice input through the microphone;
   a start instruction acceptance that accepts a start instruction by the voice input;
   an input volume determination that determines, before the voice input to be started in accordance with the start instruction acceptance accepting the start instruction is started by the voice input, whether a volume of sound input into the microphone exceeds a specific volume; and
   a movement request notification that notifies a request to move the voice input device when the input volume determination determines that the volume of the input sound exceeds the specific volume, wherein
   when the input volume determination determines that the volume of the sound is equal to or smaller than the specific volume, the voice input starts the voice input to be started in accordance with the start instruction acceptance accepting the start instruction,
   the input volume determination measures a direction in which main sound among the sound is input into the microphone, and
   when notifying the request to move the voice input device, the movement request notification notifies a direction away from a generation source of the main sound based on the direction measured by the input volume determination.

2. The voice input device according to claim 1, further comprising
   a display unit; and
   an operating unit, wherein the movement request notification notifies the request to move the voice input device by displaying on the display unit, and when an instruction for deleting the display of the request to move the voice input device is input into the operating unit, the input volume determination re-determines whether the volume of the input sound exceeds the specific volume.

3. A non-transitory computer readable medium having stored thereon a voice input program which, when executed by a computer provided with a controller and a microphone, causes the controller to provide functions of:

a voice input through the microphone;

a start instruction acceptance that accepts a start instruction of voice input by the voice input;

an input volume determination that determines, before the voice input to be started in accordance with the start instruction acceptance accepting the start instruction is started by the voice input, whether a volume of sound input into the microphone exceeds a specific volume; and a movement request notification that notifies a request to move the computer when the input volume determination determines that the volume of the input sound exceeds the specific volume, wherein when the input volume determination determines that the volume of the sound is equal to or smaller than a specific volume, the voice input starts the voice input to be started in accordance with the start instruction acceptance accepting the start instruction, the input volume determination measures a direction in which main sound among the sound is input into the microphone, and when notifying the request to move the voice input device, the movement request notification notifies a direction awayfrom a generation source of the main sound based on the direction measured by the input volume determination.

4. A voice input system comprising:

the voice input device according to claim 1; and electronic equipment that operates under an instruction from the voice input device, wherein the execution of the program by the controller of the voice input device further causes the controller to provide an instruction transmission that transmits an instruction based on voice input by the voice input to the electronic equipment.

5. The voice input device according to claim 1, wherein the request to move the voice input device includes an indication based on the direction measured by the input volume determination, and the indication is an arrow which indicates a direction awayfrom the generation source of the main sound.

6. The voice input device according to claim 1, wherein the voice input device includes two microphones disposed apart from each other, and the input volume determination determines the direction in which the main sound is input into the microphones on the basis of the sound input in each of the two microphones.

7. A voice input method using a microphone, comprising:

inputting voice through the microphone;

accepting a start instruction of voice input by the inputting;

determining, before the voice input to be started in accordance with the start instruction being accepted is started by the inputting, whether a volume of sound input into the microphone exceeds a specific volume; and notifying a request to move the voice input device when the determining determines that the volume of the input sound exceeds the specific volume, wherein when the determining determines that the volume of the sound is equal to or smaller than the specific volume, the inputting starts the voice input to be started in accordance with the start instruction acceptance accepting the start instruction, the determining measures a direction in which main sound among the sound is input into the microphone, and when the notifying notifies the request to move the voice input device, the notifying notifies a direction away from a generation source of the main sound based on the direction measured in the determining.

8. The voice input method according to claim 7, wherein the determining includes notifying a request for standby for the voice input by the inputting, and determines, after the notifying the request for standby, whether the volume of the sound input into the microphone exceeds the specific volume.

* * * * *